April 15, 1969 D. A. FISCHLER 3,439,077
PROCESS FOR MAKING PLASTIC ARTICLES HAVING
DECORATIVE SURFACE EFFECTS
Filed June 9, 1966
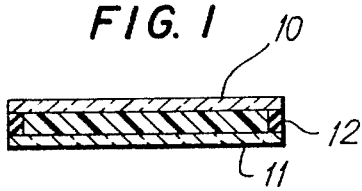
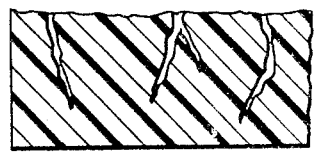
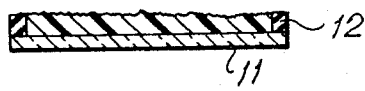
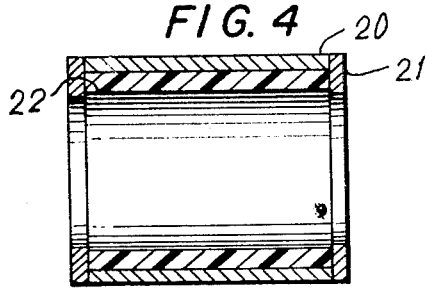
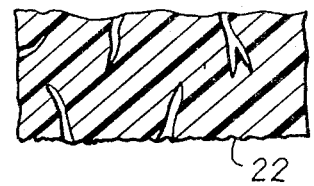
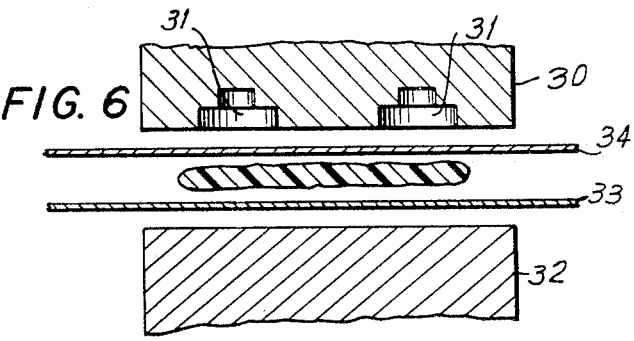
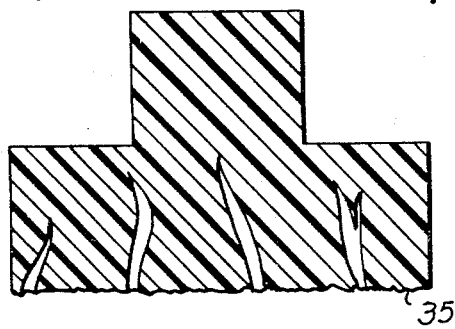
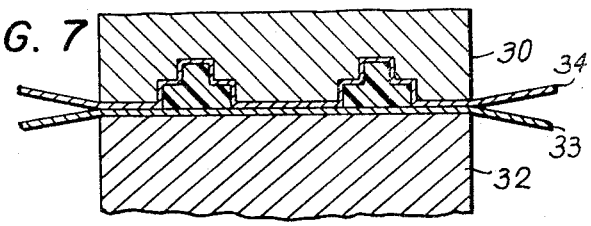
INVENTOR.
DANIEL A. FISCHLER
BY Mark Bassecher
ATTORNEY United States Patent Office 3,439,077
Patented Apr. 15, 1969

3,439,077
PROCESS FOR MAKING PLASTIC ARTICLES HAVING DECORATIVE SURFACE EFFECTS
Daniel A. Fischler, New Hyde Park, N.Y., assignor to Emsig Manufacturing Corp., New York, N.Y., a corporation of New York
Filed June 9, 1966, Ser. No. 556,430
Int. Cl. B29c 9/00
U.S. Cl. 264—73                        12 Claims

ABSTRACT OF THE DISCLOSURE

The method of forming a three-dimensional surface effect on a plastic article which includes the step of heterogeneously intermixing batches of resin, causing the resin of one batch to assume flow characteristics differing from the resin of the other batch, and applying to at least one surface of the batches a force which will texture or three-dimensionally pattern said surface by reason of the differential resuponsiveness of the batches to the deforming force.

---

This invention relates to a decorative plastic article and more particularly to a plastic article having a novel, three dimensional surface effect.

Still more particularly, this invention relates to a cast or molded plastic article of unique and attractive apearance, including a three dimensional surface effect which is achieved without the use of engraved molds, dies, three dimensional interlayers or the like.

Heretofore, when it was desired to provide a plastic article having an ornamented, three dimensional surface, one of two general methods was required to be employed to produce such surface. In accordance with one such known method, the liquid or flowable plastic material was cured while the surface to be ornamented was engaged against a surface having the desired three dimensional configurations impressed thereon or extending therefrom.

In a variation of this method, a three dimensional interlayer, such as a screen or a textile fabric, was pressed against the plastic surface, either directly or through an intermediary layer, while the plastic was curing, thus producing the desired effect.

In accordance with the second known method, the plastic was permitted to cure to its rigid stage and was thereafter subjected to carving or other surface forming operations which removed portions of the surface of the plastic, leaving the remainder in the desired configuration.

It will be readily recognized that the first aforementioned method requires for its practice the provision of specially formed dies or interlayers and the surface effects obtainable were limited in accordance with the configurations of the dies or interlayers. Naturally, the requirement for providing such dies and interlayers increased the cost of production.

In the second noted method, the forming step added greatly to the cost of production and if the forming were effected by cutting tools or the like, additional polishing operations were required to smooth the surfaces roughened by the cutting tools.

In general, the method of the present invention produces a three dimensional surface by the following means. A liquid resinous mass is prepared, which mass comprises at least two distinct plastic mixes. One such mix is calculated to be changed to the hard or semi-hard stage responsive to a first set of curing or hardening factors. The second plastic mix is calculated to be changed to the hard or semi-hard stage responsive to a second and different set of curing or hardening factors. The factors which effectively can cure the first batch are insufficient to reduce the second batch to the hard or non-flowable stage. The two batches of resin are mixed heterogeneously so as to define discrete areas.

The thus partially mixed mass is charged into a confining enclosure and subjected to the first set of curing or hardening factors, thus causing the resin components of the first batch to harden to the non-flowable or substantially non-flowable condition, while permitting the components of the second batch to remain in a liquid or flowable condition.

A surface of the batch is subjected to a deforming force which has a differential deforming effect on the semi-hard and liquid areas. In one form of the invention the batch is subjected to a centrifugal force in a cylindrical casting mold or the like, the centrifugal force acting to displace the liquid components from the level of the solid or semi-hard components, to provide the surface effect.

In a variation of the method, the mass in the noted part liquid and part solid condition is stripped or otherwise removed from the enclosure. As a result of the stripping operation, either through physical adhesion of increments of the still flowable resin to a surface of the enclosure or through the differential attraction of the hardened and flowable areas of the resin mass engaging a surface of the enclosure, a surface or surfaces of the removed resin mass will have achieved a three dimensional configuration which differs from the configuration of such surface or surfaces while the same were in contact with the enclosure.

The removed mass is thereafter subjected to the second set of curing or hardening factors, thus preventing further flow of the resin components of the second batch, the resultant article thus substantially maintaining the three dimensional surface configuration resulting from the deforming force applied to the surface while components of one of the two resin batches were still flowable.

With the foregoing in mind, it will be appreciated that endless variations of contour may be achieved.

Among the variables which regulate the appearance of the finished sheet or article may be mentioned the proportion of the resins constituting the mass, the manner and extent to which the resins are intermixed, the extent to which the first set of curing factors increases the viscosity or flowability of the resin of the second batch, the extent of the natural adhesion of the resin of the second batch to the surface of the enclosure, the extent of the deforming forces applied, etc.

The method of the present invention is susceptible of still further variations which enable the production of articles having a multitude of other novel effects. For instance, one of the batches of resin may be compounded with a dye or other coloring agent which is different from the dye or coloring agent, if any, within the second batch. The resultant article will, of course, in addition to providing a three dimensional variation in surface texture, provide a differential color effect.

As a further variation, the plastic mixture, after either the first curing step or the second curing step, may be dyed, the resinous masses for such intended use being arranged to have differential dye absorption properties.

In accordance with a preferred embodiment of the invention, the resin masses employed may be identical in composition, with the exception that one of the two masses is compounded with a catalyst in different concentration from the catalyst concentration, if any, which is contained in the other batch.

In a further variation, one of the resin batches may incorporate a different inhibitor concentration than the other batch.

From the foregoing, it will be evident that the invention is broadly directed to the concept of heterogeneously mixing compatible liquid resin masses, subjecting the masses to influences hardening one but not the other of the batches, and subjecting at least a surface of the partly fluid and partly hardened mass to a deforming force which has a greater effect on the soft than the hard areas.

To attain these objects and such further objects as may appear herein or be hereinafter pointed out, reference is made to the accompanying drawings, forming a part hereof, in which:

FIGURE 1 represents a schematic view of a casting cell for casting liquid resin;

FIGURE 2 is a further advanced view of the casting cell and resin at an intermediate stage in the processing;

FIGURE 3 is a schematic view constituting a sectional view through the hardened cast resin in accordance with the invention;

FIGURE 4 is a diagrammatic view of a centrifugal casting drum which constitutes a standard apparatus for sheet forming plastics;

FIGURE 5 is a sectional view through a hardened plastic mass formed in accordance with the method of the present invention;

FIGURE 6 is a diagrammatic view of a molding apparatus for compression molding in accordance with the method of the present invention;

FIGURE 7 is a view similar to FIGURE 6 in an advanced stage of practice of the method;

FIGURE 8 is a magnified sectional view through an article manufactured in accordance with the invention.

Referring now to the drawings, and as previously set forth, articles may be manufactured either by a casting or a molding procedure. As is well known in the art, casting may be carried out in a wide variety of ways. One such casting method is illustrated in FIGURES 1 and 2. A typical thermosetting polyester casting mixture may be constituted as follows—

A first or base batch is prepared by mixing:

90 parts by weight SELECTRON (trademark) 5014 (constituting a liquid thermosetting polyester resin mixture manufactured by Pittsburgh Plate Glass Co.)

10 parts by weight SELECTRON (trademark) 5238 (constituting a flexible polyester resin mix manufactured by Pittsburgh Plate Glass Co.)

.02 part by weight of a 6% solution of cobalt naphthanate dissolved in a non-reactive organic solvent compatible with polyester. (A suitable product is manufactured by Mooney Chemical Co.)

.3 part by weight of titanium dioxide pigment #8 PYE as manufactured by A. D. R. Co. (such material being a dispersion of titanium dioxide in liquid polyester resin).

The second batch comprises:

90 parts by weight SELECTRON (trademark) 5014;

10 parts by weight LAMINAC (trademark) 4120 (a liquid polyester resin, a product of the American Cyanamid Co.);

.02 part by weight cobalt naphthanate;

1 part by weight PMS BROWN 5520 (a paste dispersion of brown pigment in a polyester base as manufactured by Plastic Molders Supply Co.).

To the first batch only there is added:

1.5 parts by weight LUPERSOL (trademark) DDM (a catalyst constituting a 60% methylethyl ketone peroxide and 40% dimethylphthalate as manufactured by Wallace & Tiernan, Inc., Lucidol Division).

The catalyst is thoroughly mixed with the first batch just prior to casting.

After the preparation of the first and second batches, increments of said batches are heterogeneously mixed. The term "heterogeneously mixed" as herein used is intended to mean an intermixing which falls short of completely interdispersing the batches. In other words, the batches are admixed in such manner that discrete masses of one batch and discrete masses of the second batch remain.

It will be readily recognized that the manner of mixing of the two batches will, in large measure, be a determining factor in the ultimate appearance of the finished article. The interrelationship of the extent of such mixing and the appearance of the finished article will be readily appreciated from the ensuing description of the remaining steps of the procedure.

In accordance with a first embodiment, 1 part of the second, uncatalyzed batch is heterogeneously mixed with 40 parts of the first batch. The mixing is effected, in this instance, by pouring the first and second batches simultaneously into a container from separate spouts, the rate of discharge of the first batch from its spout or spouts being about forty times the rate of discharge of the second batch. The material is lightly stirred in a manner preferably to fold the discharged materials rather than intensely to agitate the same. The heterogeneously mixed materials are thereafter promptly poured into a shape producing apparatus, exemplified in the embodiment of FIGURE 1 by a casting cell. As an alternative mixing procedure, the materials may be directly discharged from the spouts into the casting cell.

The cell of FIGURE 1, which diagrammatically depicts a known apparatus for forming plastic sheets, comprises spaced upper and lower glass sheets or layers 10, 11, separated by a continuous peripheral boundary or gasket 12. It will be evident that the material is disposed in the area between the sheets either by pouring the material between the sheets, in the event that the sheets are vertically disposed or, if one sheet is horizontally disposed, the plastic mix is poured into the area surrounded by the gasket and the upper sheet is thereafter placed in position.

The material is permitted to stand at a temperature of about 75 to 80° F. for a period of about 30 minutes. At the conclusion of such period, the sheet 10 is manually lifted or stripped from the casting cell. The material of the first batch, at the termination of such period, is polymerized or cured to a degree of hardness whereat this material might be described as leathery or rubbery in texture. Such material is shape retaining but not yet rigid.

In contra-distinction to the material of the first batch, the material of the second batch in the cell is still liquid, not yet having reached the gelled or solidified condition. As a result of the disparate flow properties of the two noted materials, the removal of the sheet 10 will affect the surface in those areas where increments or isolated portions of the second batch are disposed against the surface of the sheet. The surface disorienting effect on said portions of the second batch may, in some instances, be due to a physical retention of increments of said second batch on the second cell sheet, said increments being physically removed with the removal of said sheet. Another possibility, depending upon the viscosity, surface tension and adhesion characteristics of the material of the second batch, is that removal of the sheet may cause a disorientation of the sheet adjacent portions of the second batch without physical removal of any portions of said second batch and consequent retention thereof on the sheet, said disorientation being due, instead, merely to a flow induced in such increments by removal of the sheet.

After removal of the cell sheet, the resin material may be cured completely while still in the cell, or it may be removed from the cell and thereafter cured. If the material is removed from the cell while the resin of the second batch is still in the liquid phase, it will be evident that the surface adjacent the second cell sheet 11 will likewise achieve a variegated effect.

The material is cured by maintaining the same at a temperature of about 170° F. for fifteen minutes. Such post-curing will have the effect of polymerizing the resin components of both the first and second batches to the fully hardened state.

Naturally, in accordance with standard practice, the resin mass when removed from the cell may be subjected to various forming operations, such as bending, shaping, stamping and the like, and the post-curing operation effected thereafter.

The resulting hardened articles will have a beautiful appearance characterized by a generally white base portion veined with brown portions, the inter-adjacent portions in some instances appearing in various shadings of brown. The surface, while generally smooth, will be variegated or pitted, the depth or three dimensional effect being in large measure a function of the viscosity of the second batch at the time of removal of the sheet.

It is to be understood that typically the lower the viscosity of the second batch when the resin is removed, the deeper and more uneven will be the surface, and vice versa.

A further variable will result from the nature and physical properties of the batch contacting sheet. For instance, if the resin composition is contacted with a material substantially incapable of being wetted by the resin, an example of such material being Teflon, little variegation will result from the removal of the sheet.

A further factor which determines the three dimensional effect of the surface is the degree of admixing and the proportion of the batches.

Thus it will be understood that literally endless effects may be achieved by varying the proportion of the resin batches, the degree of cure of the still liquid batch or batches at the time or removal of the mass from the mold, the manner of mixing, and the nature of the resin contacting surfaces.

Referring now to FIGURES 4 and 5, 20 refers to a diagrammatic representation of a hollow cylindrical body which is being rotated about a hoizontal axis, such apparatus being customarily referred to as a cylindrical casting drum. The cylindrical member includes radially inwardly directed end flanges 21 which, in known manner, prevent the liquid resin from flowing outwardly beyond the cylindrical casting drum. Optionally, prior to introduction of the liquid resin mix, a barrier sheet, such as wax paper, Kraft paper, cellophane or the like, may be placed against the inner surface of the drum.

In the use of the embodiment of FIGURE 4, a heterogeneous mixture of batches 1 and 2 previously described are charged into the interior of the drum. It will be understood that in this instance the ratio of approximately 40 parts of batch 1 to 1 part of batch 2 may be maintained, or that this ratio may be varied. Since, however, the usual practice of the method involves removal of the material at a point where the material has some shape and body, i.e. is at least a semi-solid, the practice of the method normally involves a substantially higher ratio of catalyzed or rapidly hardening resin to uncatalyzed or slower hardening resin.

In the use of the method in conjunction with a cylindrical casting drum, it is preferred that the two resin batches be not mixed prior to introduction into the drum but, rather, that the resin, in the proper proportions, be simultaneously discharged into the drum while the same is rotating, the rotational forces serving both to distribute the material within the drum and to cause the heterogeneous mixture of said materials.

After the material is charged into the mold, the mold is permitted to rotate at a speed which, in known manner, is a function of the diameter of the drum, the speed being at least sufficient to induce centrifugal forces necessary to form a smooth layer.

The material remains in the drum for periods of about 30 minutes at a temperature of about 75 to 80° F. At this point the material will have achieved the leathery condition mentioned in connection with the prior embodiment.

The material is stripped from the mold either in its cylindrical shape or the material may be slit lengthwise and removed as a sheet.

As seen from FIGURE 5, the material will have a variegated or stippled effect on both of its faces, the effect on the drum adjacent face being occasioned by the stripping of the material from the drum surface or from the surface of a sheet disposed adjacent the drum. The variegation on the inner surface 22 of the material will be occasioned by the deforming effect of the forces generated by the rotating drum which act in a differential manner of the liquid resin components of the second batch than on the resin components of the first batch which increase in viscosity at a greater rate and solidify while the materials of the second batch remain liquid.

As in the case of the first mentioned procedure, the partly cured plastic mass is subjected to a post-curing step either before or after the performance on the mass of any desired forming, shaping, stamping or like operations.

The cured sheet will be found to have a beautiful, variegated appearance and a three dimensional surface not unlike natural horn. Since the darker colored components run entirely through the depth of the finished article, it will be evident that the variegated effect is not merely a surface effect and different shades and gradations of color exist throughout the body of the article. Thus, if portions of the article are cut or machined away, the interior will be found to have a highly desirable marbelized effect.

In the method employing the centrifugal casting drum, it is possible to continue the cure to a greater degree while the material is still in the drum or, by the application of heat against the outer periphery of the drum itself, to cause the material of the second batch adjacent and contacting the drum to cure substantially to the not readily flowable condition. In such instance, only the inner surface of the sheet will exhibit the three dimensional effect, the drum adjacent surface being smooth but variegated in appearance.

In FIGURES 6 and 7 there is shown a variation of the precedure which involves achieving a three dimensional surface effect through a compression molding process of the general type disclosed in United States Patent No. 2,652,597. A formulation for compression molding is as follows:

The first batch comprises:

90 parts by weight Laminac (Trademark) 4120;
10 parts by weight Selectron (Trademark) 5238;
2 parts by weight of a paste comprising 50% benzoyl peroxide dispersed in tricresylphosphate;
.3 parts by weight titanium dioxide pigment #8 PYE.

The second batch comprises:

90 parts by weight Laminac (Trademark) 4120;
10 parts by weight Selectron (Trademark) 5238;
.1 part by weight PMS Brown 5520.

Forty parts by weight of the first batch are heterogeneously mixed with 1 part by weight of the second batch.

A mold of convenient structure comprising a heated upper die plate 30, having cavities 31, and a heated lower die plate 32, is used to carry out the procedure.

A mass of resin from the heterogeneously mixed batches sufficient to fill cavities 31 with slight excess is placed between two sheets 33, 34 of a stretchable membrane, such as cellophane, polyvinyl alcohol, Mylar or the like. The mold is provided with confining means (not shown), conventional in nature, which engage the periphery of the sheets 33, 34 to prevent undue migration of the resin mass outwardly of the mold area. The mold parts, which are heated to about 300° F., are closed under a pressure of about 800–1000 p.s.i. and the mold parts are maintained in such closed condition for a period of about forty seconds to one minute. The mold parts are then opened and the material is removed from between the mold parts through the use of the barrier sheets 33, 34.

As will be evident from FIGURE 7, as a result of the molding, barrier sheet 34 has been caused to conform to the shape of the cavities 31. After removal from the mold, the generally flat sheet 33 (which need not be stretchable where no cavities or contours exist in the die plate 32) is stripped, leaving the molded plastic articles (in the illustrated embodiment, shank buttons) still on the contoured sheet 34.

The action of removing the sheet 33 will result in a deformation of those portions of the surface of the article which consist of or comprise the uncatalyzed second batch of resin, the three dimensional effect in this instance being due to the differential effect on the partly liquid and partly semi-solid sheet engaging surface occasioned by stripping of the sheet 33.

The article is then subjected to a post-curing step, preferably while still in contact with sheet 34, resulting in the production of a button shown in FIGURE 8 wherein the surface 35 is three dimensional.

As will be evident from the preceding description, the appearance of the compression molded articles may be varied in accordance with the degree of admixture, proportion, mold cycle, nature of the barrier sheet 33, etc.

From the foregoing descriptions, it will be apparent that the process, in its broadest phases, is not limited to any particular resins or resin types although, for convenience, the same has been described in connection with polyester resin formulations which are particularly suitable for use in the process.

It is altogether conceivable to use the process in conjunction with thermoplastic resins or other types of thermosetting resins besides the polyesters.

As will be apparent, the process involves heterogeneously mixing two or more resin masses which are subject to hardening at different rates in response to a predetermined hardening influence. The resins are mixed in a proportion to define a main or matrix or shape retaining batch, and increments of supplementary, auxiliary batches, hardening the matrix batch to the so-called B stage or beyond through the use of hardening factors which are insufficient to advance the cure or hardening of the supplementary batches to the B stage, i.e., which will leave these supplementary batches in a still liquid and, hence, relatively flowable stage.

At least a surface of the material thus processed is subjected to forces of some nature which will act differentially against the differentially flowable components defining the surface, thus to disarrange the same and result in a three dimensional rather than a smooth surface.

While in the illustrative examples, the first and second batches have been pigmented to define different colors, it will be understood that interesting effects may be achieved without coloring either of the batches.

Further, where different resins are used to define the intermixed batches, varying effects may be achieved by dyeing the finished article or the article at an intermediate stage. Where catalyzed and uncatalyzed polyester batches are employed, it is to be observed that even in the finished, fully cured article, the uncatalyzed batch has a greater ability to absorb dye and, hence, shadings of color which vary in the two batches may be achieved by subjecting the articles to post-dyeing operations, using a single dye.

Having thus described the invention and illustrated its use, what is claimed as new and is desired to be secured by Letters Patent is:

1. The method of making a plastic article having a three dimensional ornamented surface effect which comprises heterogeneously intermixing first and second liquid resin batches, said first batch being polymerizable to a semi-solid state responsive to a predetermined set of polymerizing factors, said factors being insufficient to polymerize said second batch to said semi-solid phase, forming said mixed batches to a substantially finished shape, having a surface with a predetermined contour, curing said formed first batch to the semi-solid state while maintaining said second batch in the liquid phase, thereafter subjecting at least said surface of the formed article having said predetermined contour to forces which will displace components of the liquid phase material of said surface from said predetermined contour, thereby to three-dimensionally modify said predetermined contour, and thereafter curing said objects to the hardened condition to provide an article having a three dimensional surface effect differing from said predetermined contour.

2. The method in accordance with claim 1 wherein said deforming forces constitute a centrifugal force.

3. The method of making a plastic article having a three dimensional ornamented surface effect which comprises heterogeneously intermixing first and second liquid resin batches, said first batch being polymerizable to a semi-solid state responsive to a predetermined set of polymerizing factors, said factors being insufficient to polymerize said second batch to said semi-solid state, forming said mixed batches to a desired configuration, contacting at least said one surface of said batches with a boundary member, subjecting said formed batches to said first set of polymerizing factors, thus curing said first batch to the semi-solid state while maintaining said second batch in the liquid phase, subjecting at least said one surface of said mixed batches in the semi-solid and liquid phase, respectively to deforming forces to which said batch in the liquid phase will respond to a degree varying from that to which the batch in the solid phase will respond by separating said boundary member and said surface, thus to deform said one surface by reason of the differential flow of the surface portions defined by said first batch and said second batch in response to said separating force, and thereafter curing said batches to the hardened condition.

4. A method in accordance with claim 3 wherein said boundary member is capable of being wetted by said resin in the liquid state.

5. A method in accordance with claim 1 wherein the resins of said batches comprise unsaturated polyesters, at least said one of said resins having a greater catalyst concentration than the other of said resins.

6. A method in accordance with claim 1 wherein said other batch is provided with a greater inhibitor concentration than said one batch.

7. The method in accordance with claim 1 wherein a batch of said resin is colored differently from said one batch.

8. The method of forming an ornamental article comprising providing first and second batches of liquid thermosetting resin, intermixing said batches of resin to form a heterogeneous mass defining discrete adjacent areas of said first and second batches, disposing said mass against a surface, causing at least the surface adjacent portions of said first batch to polymerize at least to the B stage while maintaining said second batch portion of said mass in a polymerized state short of the B stage, separating said batch from said surface while said second batch portion of said mass is in a polymerized state short of the B stage, and thereafter causing said separated mass to be cured to the hard condition thereof.

9. The method of producing an ornamental article which comprises the steps of preparing a first batch of liquid thermosetting resin mix curable to the B stage responsive to exposure of said resin to a first predetermined set of polymerization factors, preparing a second batch of liquid thermosetting resin mix compatible with said first batch and curable to the B stage responsive to exposure of said second batch to a second predetermined set of polymerizing factors, said second batch being resistant to cure to said B stage under the influence of said first set of polymerization factors, mixing said first and second batches of resin mix to form a heterogeneous mass containing discrete areas of said first and second batches, disposing said mass in a confining space having boundary surfaces of a predetermined desired shape, exposing said mass in said space to said first set of polymerizing factors to cause said first batch components of said mass to cure to at least the B stage, removing said mass from said space after said first batch components of said mix have been cured to at least said B stage and before said second batch components have been cured to said B stage, and thereafter exposing said mass to said second set of polymerizing factors.

10. The method of producing an ornamental plastic article comprising the steps of preparing a first batch of liquid thermosetting resin, polymerizable under predetermined heat and time conditions progressively to a semi-rigid stage and to a hard stage, preparing a second batch of liquid thermosetting resin polymerizable under predetermined heat and time conditions progressively to a semi-rigid stage and to a hard stage, mixing said first and second batches in the liquid condition to intersperse said batches heterogeneously, contacting at least a portion of said mixed batches with a boundary surface, subjecting said mixed batches to heat and time conditions sufficient to polymerize at least the boundary adjacent portions of said first batch to at least the semi-rigid stage, said heat and time conditions being insufficient to polymerize said second batch to said semi-hard stage, thereafter removing said contacting portion of said mixed batches from said boundary surface while said second batch is still in the liquid stage and thus has a differential adhesion to said surface as contrasted with said first batch, and thereafter causing said mixed batches to polymerize to the hard stage.

11. The method of making an ornamented article having three dimensional surface effects which comprises mixing heterogeneously two liquid resin batches, causing a boundary surface to contact a portion of said mixed batches, subjecting said mixed batches while in contact with said surface to polymerizing influences effective to cure one said batch to at least a semi-solid, shape retaining condition, said polymerizing influences being insufficient to solidify the other said batch, removing said mixed batches from contact with said surface while the adhesion of one said batch differs from that of the other said batch, thus to provide an undulant surface, and thereafter causing both said batches to cure to the hardened condition thereof.

12. The method of making a plastic article having a three dimensional, ornamented surface effect which comprises intermixing heterogeneously a plurality of liquid resin batches, at least one of said batches being polymerizable to a semi-solid state responsive to a predetermined set of polymerizing factors, said factors being insufficient to polymerize the other of said batches to said semi-solid phase forming said mixed batches to a desired, substantially finished configuration, subjecting said formed batches to said first set of polymerizing factors, thus curing said one of said batches at least to the semi-solid state while maintaining other of said batches in the liquid phase, subjecting at least one surface of said formed mixed batches in the semi-solid and liquid phase, respectively, to deforming forces to which the surface of said resin in the liquid phase will respond to a degree varying from that to which the surface of said resin in said solid phase will respond, thus to three-dimensionally modify said one surface by reason of the differential flow of the surface portions defined by said batches, and thereafter curing said batches to the hardened condition.

References Cited

UNITED STATES PATENTS

| 1,506,060 | 8/1924 | Henker | 264—73 |
| 1,735,674 | 11/1929 | Copeland | 264—77 X |
| 2,761,176 | 9/1956 | Welch | 264—77 |
| 2,944,293 | 7/1960 | Taylor | 264—73 X |

FOREIGN PATENTS

| 120,575 | 10/1918 | Great Britain. |
| 489,467 | 7/1938 | Great Britain. |

ROBERT F. WHITE, *Primary Examiner.*

S. I. LANDSMAN, *Assistant Examiner.*

U.S. Cl. X.R.

161—117, 164; 264—77, 78, 163, 236, 241, 293, 311